US012567134B2

(12) United States Patent (10) Patent No.: US 12,567,134 B2
Nalam Venkat et al. (45) Date of Patent: Mar. 3, 2026

(54) APPARATUS AND METHODS OF DETECTING DEFECTS IN MACHINE VISION SYSTEMS

(71) Applicant: Siemens Healthcare Diagnostics Inc., Tarrytown, NY (US)

(72) Inventors: Rayal Raj Prasad Nalam Venkat, Princeton, NJ (US); Yao-Jen Chang, Princeton, NJ (US); Benjamin S. Pollack, Jersey City, NJ (US); Ankur Kapoor, Plainsboro, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 5 days.

(21) Appl. No.: 18/264,237

(22) PCT Filed: Feb. 2, 2022

(86) PCT No.: PCT/US2022/014992
§ 371 (c)(1),
(2) Date: Aug. 3, 2023

(87) PCT Pub. No.: WO2022/169910
PCT Pub. Date: Aug. 11, 2022

(65) Prior Publication Data
US 2024/0037723 A1 Feb. 1, 2024

Related U.S. Application Data

(60) Provisional application No. 63/145,953, filed on Feb. 4, 2021.

(51) Int. Cl.
*H04N 17/02* (2006.01)
*G06T 7/00* (2017.01)
(Continued)

(52) U.S. Cl.
CPC ........... *G06T 7/0002* (2013.01); *H04N 5/265* (2013.01); *H04N 17/002* (2013.01); *G06T 2207/20212* (2013.01); *H04N 23/90* (2023.01)

(58) Field of Classification Search
CPC ...... H04N 5/265; H04N 17/002; H04N 23/90; G06T 7/0002; G06T 2207/20212
(Continued)

(56) References Cited

U.S. PATENT DOCUMENTS 5,771,068 A 6/1998 Sali et al.
5,826,916 A 10/1998 Phillips
(Continued)

FOREIGN PATENT DOCUMENTS

CN 106796179 A 5/2017
CN 107340297 A 11/2017
(Continued)

OTHER PUBLICATIONS

PCT International Search Report and Written Opinion dated May 11, 2022 (11 Pages).
(Continued)

*Primary Examiner* — Trang U Tran

(57) ABSTRACT

Methods of identifying a defect in a machine vision system. Embodiments of the method include providing a first imaging device having a first field of view; moving a reflective tool through the first field of view; capturing a plurality of images of the reflective tool at different locations in the first field of view using the first imaging device; and analyzing at least one of the plurality of images to identify one or more defects in the machine vision system. Systems and apparatus configured to carry out the methods are provided, as are other aspects.

17 Claims, 9 Drawing Sheets

(51) Int. Cl.
    *H04N 5/265*     (2006.01)
    *H04N 17/00*     (2006.01)
    *H04N 23/90*     (2023.01)

(58) Field of Classification Search
    USPC ........................................................ 348/187
    See application file for complete search history.

(56)          References Cited

U.S. PATENT DOCUMENTS

| | | | |
|---|---|---|---|
| 5,909,504 A * | 6/1999 | Whitman | G06T 7/0006 |
| | | | 382/141 |
| 6,940,554 B2 | 9/2005 | Robins et al. | |
| 8,854,431 B2 | 10/2014 | Song et al. | |
| 9,796,089 B2 | 10/2017 | Lawrence, III et al. | |
| 10,453,215 B2 | 10/2019 | Park et al. | |
| 10,697,900 B2 * | 6/2020 | Zhang | G06T 7/001 |
| 11,624,711 B2 * | 4/2023 | Hewicker | H04N 23/56 |
| | | | 382/141 |
| 11,935,216 B2 * | 3/2024 | Lu | G06T 7/001 |
| 2004/0169663 A1 | 9/2004 | Bernier | |
| 2008/0187181 A1 | 8/2008 | Meadow et al. | |
| 2011/0273569 A1 | 11/2011 | Douady et al. | |
| 2013/0271755 A1 | 10/2013 | Lindner | |
| 2014/0198202 A1 | 7/2014 | Kim | |
| 2014/0368668 A1 | 12/2014 | Sasabuchi et al. | |
| 2014/0374480 A1 | 12/2014 | Pollack | |
| 2016/0321796 A1 | 11/2016 | Dordoni et al. | |
| 2017/0255766 A1 | 9/2017 | Kaehler | |
| 2019/0128908 A1 | 5/2019 | Nakagawa et al. | |

FOREIGN PATENT DOCUMENTS

| | | |
|---|---|---|
| CN | 107923837 A | 4/2018 |
| CN | 108603802 A | 9/2018 |
| DE | 102014203798 A1 | 9/2015 |
| JP | H05302898 A | 11/1993 |
| JP | H06148083 A | 5/1994 |
| JP | H0868617 A | 3/1996 |
| JP | 2000241345 A | 9/2000 |
| JP | 2003259358 A | 9/2003 |
| JP | 2008014768 A | 1/2008 |
| JP | 2008032653 A | 2/2008 |
| JP | 2008241650 A | 10/2008 |
| JP | 2015509202 A | 3/2015 |
| JP | 2016224707 A | 12/2016 |
| WO | 2014034526 A1 | 3/2014 |
| WO | 2017132162 A1 | 8/2017 |
| WO | 2018089935 A1 | 5/2018 |
| WO | 2020/061365 A1 | 3/2020 |

OTHER PUBLICATIONS

Tsai, Du-Ming et al: "The evaluation of normalized cross correlations for defect detection", Pattern Recognition Letters, Elsevier, Amsterdam, NL, vol. 24, No. 15, Nov. 1, 2003 (Nov. 1, 2003), pp. 2525-2535, XP004443620, ISSN: 0176-8655, DOI: 10.1016/S0167-8655(03)00098-9.

* cited by examiner

Position 5

Position 6

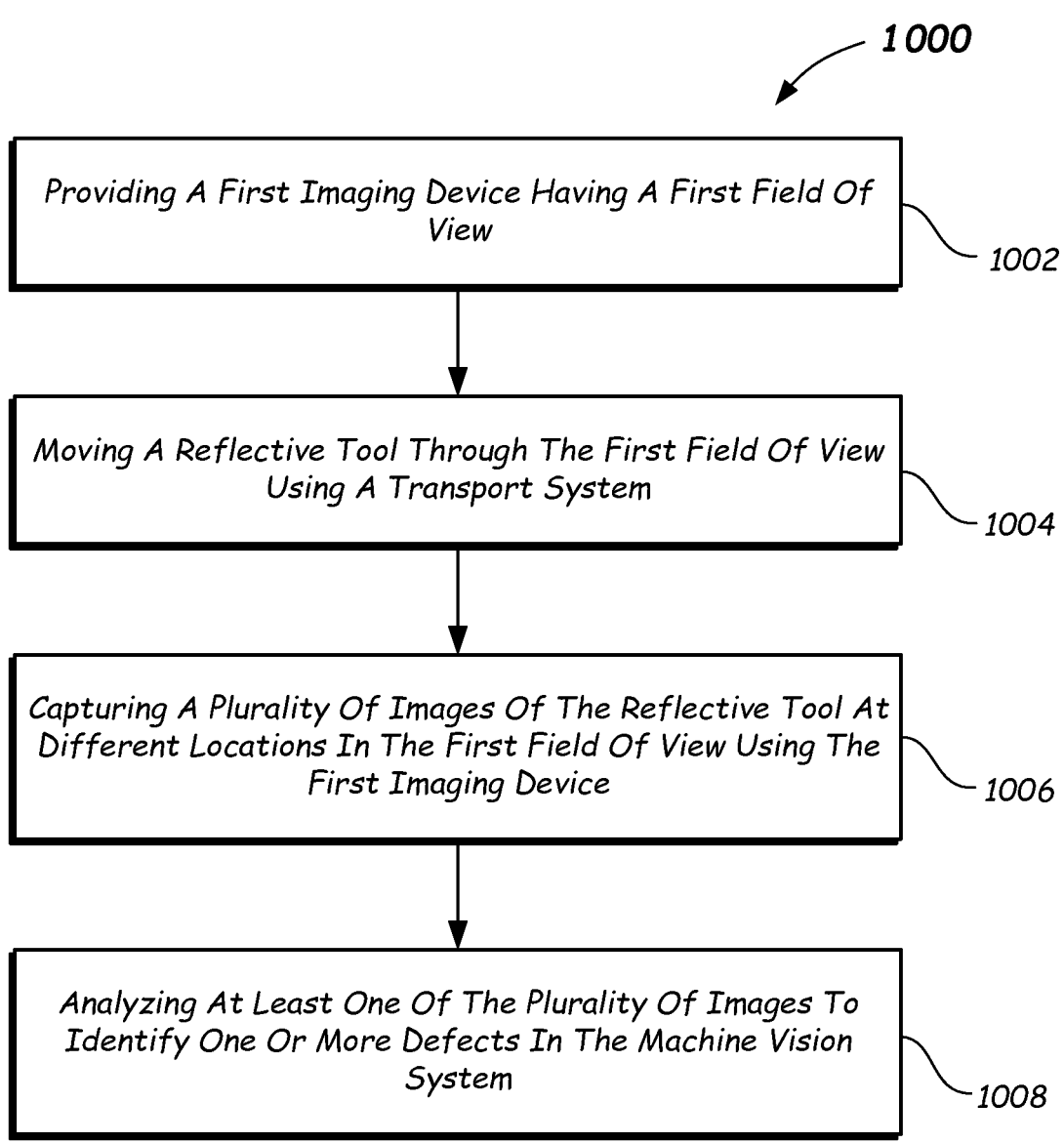

*1000*

Providing A First Imaging Device Having A First Field Of View — *1002*

Moving A Reflective Tool Through The First Field Of View Using A Transport System — *1004*

Capturing A Plurality Of Images Of The Reflective Tool At Different Locations In The First Field Of View Using The First Imaging Device — *1006*

Analyzing At Least One Of The Plurality Of Images To Identify One Or More Defects In The Machine Vision System — *1008*

Providing An Imaging Device Having A Field Of View — *1102*

Moving A Reflective Tool Through The Field Of View — *1104*

Capturing A Plurality Of Images Of The Reflective Tool At Different Locations In The Field Of View Using The First Imaging Device — *1106*

Analyzing At Least One Of The Plurality Of Images To Identify One Or More Defects In The Optical Inspection Station — *1108*

APPARATUS AND METHODS OF DETECTING DEFECTS IN MACHINE VISION SYSTEMS

CROSS REFERENCE TO RELATED APPLICATIONS

This disclosure is a 371 of PCT/US2022/014992, filed Feb. 2, 2022, which claims the benefit of U.S. Provisional Patent Application No. 63/145,953, entitled "APPARATUS AND METHODS OF DETECTING DEFECTS IN MACHINE VISION SYSTEMS," filed Feb. 4, 2021, the disclosures of which are hereby incorporated by reference in their entireties for all purposes herein.

FIELD

Embodiments of the present disclosure relate to apparatus and methods of detecting defects in machine vision systems.

BACKGROUND

Automated testing systems may conduct clinical chemistry analysis and/or assays using machine vision systems. The machine vision systems may analyze specimens and/or specimen containers in which the specimens are contained. For example, the machine vision systems may capture images of specimen containers and/or specimens located therein and generate image data representative of the captured images. The machine vision systems or devices coupled thereto may analyze the image data.

Image data representative of the specimen containers may be analyzed to determine a size of the specimen containers, read labels attached to the specimen containers, detect the presence of caps, and/or determine the color and/or shape of the caps. The image data representative of the specimens may also be analyzed to determine the presence of an interferent, such as hemolysis, icterus, and/or lipemia and/or the presence of an artifact in the specimens such as clot, bubble(s), or foam.

SUMMARY

According to a first aspect, a method of identifying a defect in a machine vision system is provided. The method includes providing a first imaging device having a first field of view; moving a reflective tool through the first field of view; capturing a plurality of images of the reflective tool at different locations in the first field of view using the first imaging device; and analyzing at least one of the plurality of images to identify one or more defects in the machine vision system.

In a further aspect, a method of identifying a defect of an optical inspection station is provided. The method includes providing an imaging device having a field of view; providing a transport system configured to move specimen containers through the field of view; moving a reflective tool through the field of view; capturing a plurality of images of the reflective tool at different locations in the field of view using the imaging device; and analyzing at least one of the plurality of images to identify one or more defects in the optical inspection station.

In another aspect, a machine vision system is provided. The system includes an imaging device having a field of view and configured to capture a plurality of images of a reflective tool at different locations in the field of view; a transport system configured to move specimen containers and the reflective tool through the field of view; and a computer configured to analyze at least one of the plurality of images and to determine whether a defect exists in an optical chain of the machine vision system.

Still other aspects, features, and advantages of this disclosure may be readily apparent from the following description and illustration of a number of example embodiments, including the best mode contemplated for carrying out the disclosure. This disclosure may also be capable of other and different embodiments, and its several details may be modified in various respects, all without departing from the scope of the disclosure. This disclosure is intended to cover all modifications, equivalents, and alternatives falling within the scope of the claims and their equivalents.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the disclosure in any way.

FIG. 10 illustrates a flowchart showing a method of identifying a defect in a machine vision system according to one or more embodiments.

DETAILED DESCRIPTION

Figure 1:
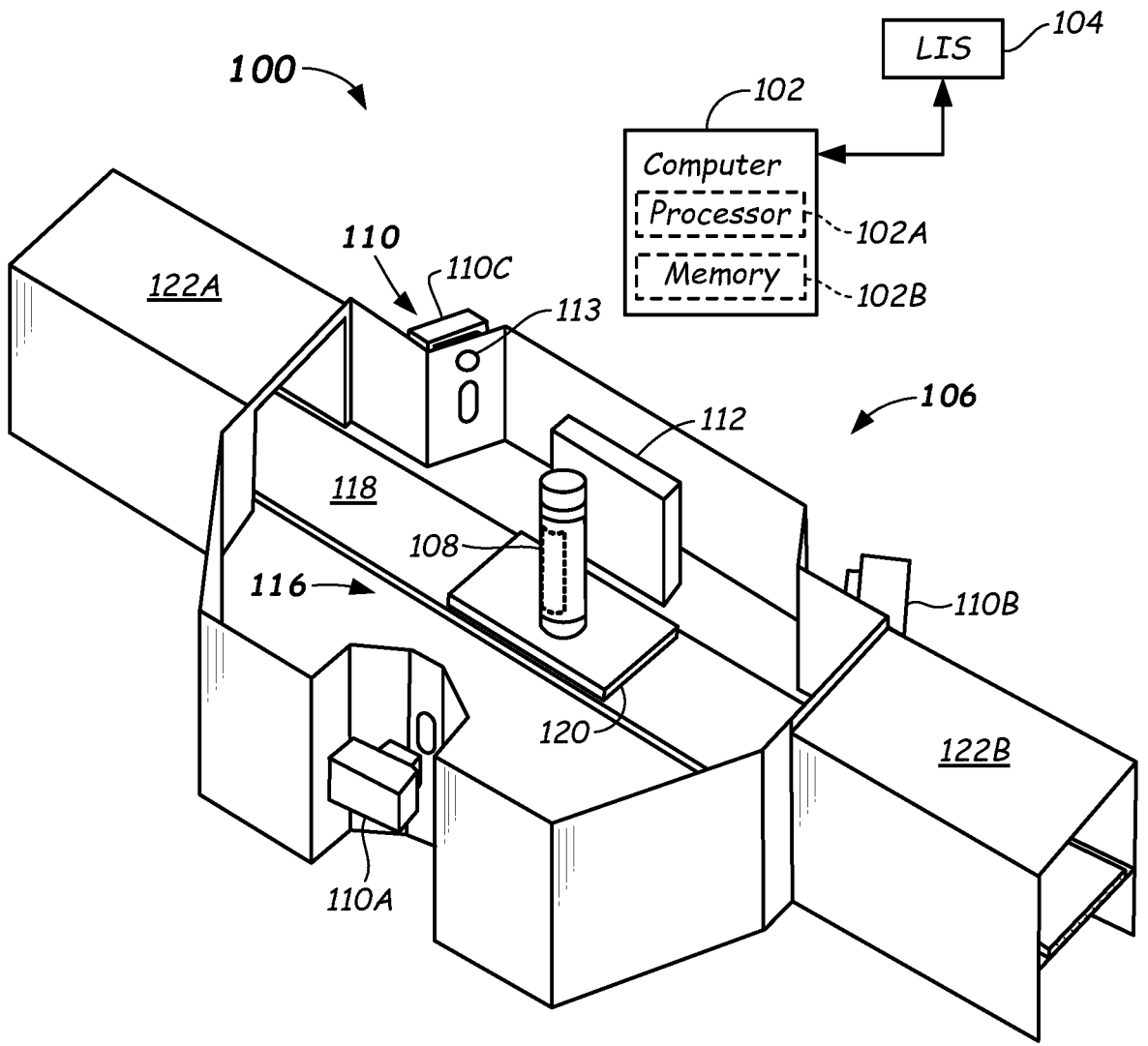
FIG. 1 illustrates a top isometric view of an optical inspection station including a machine vision system according to one or more embodiments.

In some embodiments, analysis of the images may be used to check the quality of the specimen container and/or the specimen located therein to ensure appropriateness of the specimen container and/or the specimen located therein. For example, if the color of a cap and/or shape of the cap do not correspond with a test to be conducted, an error can be flagged to an operator/technician. For example, a phlebotomist may have used an inappropriate specimen container type for a test that has been ordered. For example, a coagulant-containing specimen container may have been used when an anticoagulant-containing specimen container has been called for in a specific test. Improved characterization of the cap type and/or cap shape aid in detecting these incorrect scenarios.

In other embodiments, the specimens may be optically pre-screened for the presence of hemolysis, icterus, lipemia, and/or normality (N) and/or the presence of an artifact (e.g., clot, foam, and/or bubble(s)) therein, for example. The machine vision systems require very detailed and accurate images in order to provide accurate analysis of the sample containers and/or the specimens.

Machine vision systems may generate erroneous images and/or image data if dirt or other particles are present in optical chains within the machine vision systems. Erroneous images and/or images data may also be generated if one or more optical components are defective. Thus, methods and apparatus that analyze optical chains and/or components of machine vision systems are provided herein.

The machine vision systems may include illumination components (e.g., light emitting diode (LED) panels) that illuminate the specimen containers and/or the specimens. Imagers (e.g., charge-coupled devices (CCDs) or complementary metal-oxide semiconductor (CMOS) image sensors) convert images of the specimen containers and/or the specimens to image data that can be processed and/or analyzed by software. Lenses within the machine vision systems focus light, such as light reflected from the specimen containers and/or the specimens, onto the imagers.

Optical chains within machine vision systems include optical devices and light paths used to generate image data of objects imaged by the machine vision systems. Optical chains may include illumination devices, imaging devices, and light paths extending between the devices. Any defect (e.g., anomaly) in the optical chain, such as a scratch or dirt particles on the lenses or imagers, could possibly impact the accuracy of the optical analysis. In some embodiments, the defects may be particles on the illumination devices and/or defective illumination devices. The defects may cause the machine vision systems to misclassify specimen containers and/or specimens or improperly analyze specimens. Methods and apparatus are described herein that determine whether defects exist in the optical chains of machine vision systems.

Embodiments of machine vision systems disclosed herein move a reflective tool through a field of view of an imaging device and capture images of the reflective tool at different locations within the fields of view. Images of the reflective tool are analyzed to determine whether defects are present in the optical chain. In some embodiments, the images are stitched together to form a single image that may be referred to as a synthetic canvas or synthetic background. The synthetic background can be analyzed to determine whether defects are present in the optical chain. These and other methods, apparatus, and systems are described in greater detail with reference to FIGS. 1-11 herein.

Reference is now made to FIG. 1, which illustrates a top isometric view of a vision-based inspection station 100, which may be referred to herein as an optical inspection station 100. The optical inspection station 100, as shown in FIG. 1, is implemented as a part of a quality check module, for example. However, the optical inspection station may be implemented within other modules. The optical inspection station 100 is configured to optically analyze specimen containers and/or specimens located therein. The optical inspection station 100 is shown as having an open top for illustration purposes. However, the optical inspection station 100 may be closed so as to prevent extraneous light from entering the optical inspection station 100.

The optical inspection station 100 may be one of many modules in a diagnostic laboratory system that analyses specimens. The optical inspection station 100 may include a computer 102 that may be in communication with a laboratory information server (LIS) 104. The computer 102 may include a processor 102A and memory 102B, wherein the memory 102B stores programs that are executed by the processor 102A.

In some embodiments, the one or more programs are configured to process image data and electronically stick images or portions of images together. The one or more programs may also be configured to analyze the image data to detect defects in optical chains as described herein. The LIS 104 may receive from a hospital information system certain information regarding analysis (e.g., tests) to be run on specimens using the optical inspection station 100 and other modules in a diagnostic laboratory system. Likewise, LIS may receive information regarding whether any detect defects are present in optical chains. In some embodiments, the computer 102 and the LIS 104 may be implemented as a single device.

The optical inspection station 100 may include a machine vision system 106. The machine vision system 106 and/or components thereof may be in communication (e.g., electrically coupled) with the computer 102. The machine vision system 106 captures images of specimen containers and/or specimens located therein and generates image data representative of the images. In the embodiment of FIG. 1, the optical inspection station 100 has a specimen container 108 located therein. The computer 102 may process the image data of the specimen container 108 as described herein.

The machine vision system 106 includes one or more imaging devices 110. In the embodiment of FIG. 1, the machine vision system 106 includes three imaging devices 110, referred to individually as a first imaging device 110A, a second imaging device 110B, and a third imaging device 110C.

The machine vision system 106 may include one or more illumination sources that illuminate the specimen container 108. The illumination sources may include front illumination sources that illuminate the front of the specimen container 108 relative to an imaging device. The illumination sources may also include back illumination sources that provide back illumination of the specimen container 108 relative to an imaging device. In the embodiment of FIG. 1, the machine vision system 106 includes a single back illumination source configured as a light panel 112 that provides back illumination of the specimen container 108 relative to the first imaging device 110A. The light panel 112 may be coupled to the computer 102, wherein the computer 102 is configured to turn the light panel 112 off and on. The light panel 112 is in alignment with the first imaging device 110A to provide back lighting of the specimen container 108. When the light panel 112 is on (e.g., illuminating), the first imaging device 110A may capture an image of the light panel 112 or anything located between the light panel 112 and the first imaging device 110A, such as the specimen container 108. Some embodiments of the machine vision system 106 do not include any light panel assemblies.

As described above, the machine vision system 106 may include one or more front illumination sources that illuminate the front of the specimen container 108 relative to one or more of the imaging devices 110. In some embodiments, one or more of the imaging devices 110 may include one or more illumination sources. In the embodiment of FIG. 1, the machine vision system 106 may include an illumination source 113 located proximate the third imaging device 110C. In some embodiments, the machine vision system 106 may include an illumination source 313 (FIG. 3) associated with the second imaging device 110B.

The illumination source 113 may include one or more light-emitting diodes. The illumination source 113 may be in different locations, such as affixed to the third imaging device 110C. In some embodiments, the illumination source 113 may be affixed to a wall of the optical inspection station 100, such as proximate the third imaging device 110C. The illumination source 113 may be configured to illuminate the specimen container 108 with incident light. Light reflected from the specimen container is incident on the third imaging device 110C, wherein the reflected light can be used to capture images of the specimen container 108.

The optical inspection station 100 may include a transport system 116 configured to move the specimen container 108 through the optical inspection station 100. The transport system 116 may include a track 118 on which the carrier 120 may move. The carrier 120 may be configured to carry or hold the specimen container 108 in an upright orientation as shown. The track 118 may be a railed track (e.g., a mono rail or a multiple rail), a collection of conveyor belts, conveyor chains, moveable platforms, magnetic transportation system, or any other suitable type of conveyance mechanism. In some embodiments, the carrier 120 may be self-propelled on the track 118 and can be configured to stop along the track 118 at programmed locations. The transport system 116 may control the speed in which the specimen container 108 moves through the optical inspection station 100 and may stop the movement of the specimen container 108 within the machine vision system 106.

The optical inspection station 100 may include an entrance tunnel 122A and an exit tunnel 122B, wherein specimen container 108 enters the optical inspection station 100 via the entrance tunnel 122A and exits the optical inspection station 100 via the exit tunnel 122B. The entrance tunnel 122A and the exit tunnel 122B enable the specimen container 108 to pass into and out of the optical inspection station 100 without allowing external light from entering the optical inspection station 100.

Figure 2:
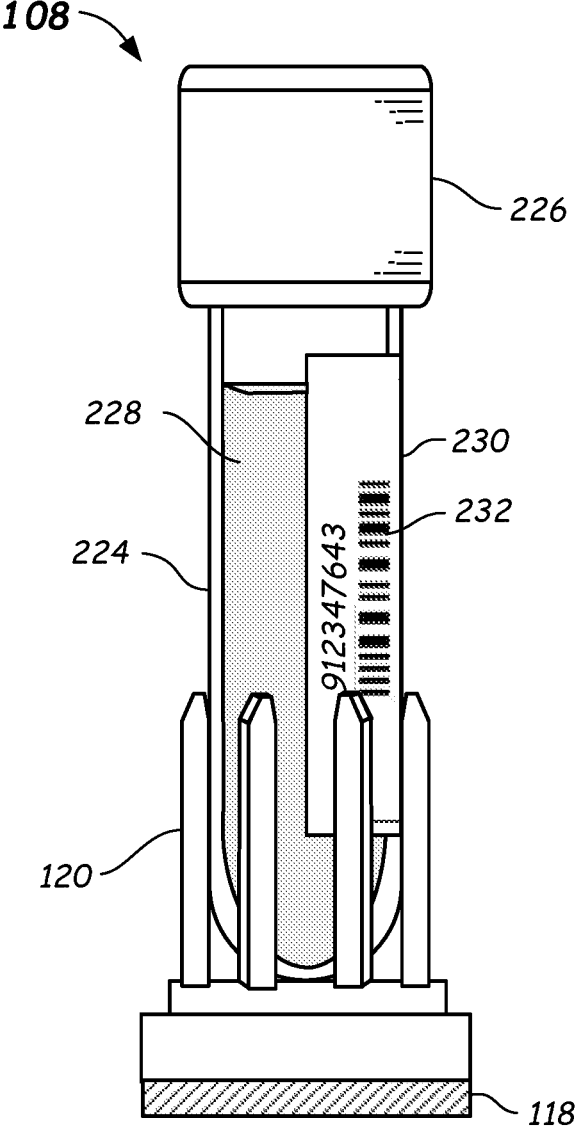
FIG. 2 illustrates a side elevation view of a specimen container holding a specimen, wherein the specimen container is located in an upright orientation in a carrier moveable on a transport system according to one or more embodiments.

Additional reference is made to FIG. 2, which illustrates a side elevation view of the specimen container 108 in a carrier 220. The specimen container 108 includes a tube 224 and may be capped by a cap 226. A specimen 228 may be located in the tube 224. The specimen 228 may be any liquid that is to be analyzed by a diagnostic laboratory analyzer in which the optical inspection station 100 (FIG. 1) is within or associated with. The tube 224 may have a label 230 attached thereto. The label 230 may contain information, such as a barcode 232, related to the specimen 228. In some embodiments, the information may include numbers and/or letters that identify the specimen 228. Images of the barcode 232 may be captured by one or more of the imaging devices 110. In some embodiments, images of the specimen 228 may be captured by the imaging devices 110. In other embodiments, images of the cap 226 may be captured by the imaging devices 110. In some embodiments, images of the tube 224, the cap 226, and/or the specimen 228 may be captured by the imaging devices 110.

Figure 3:
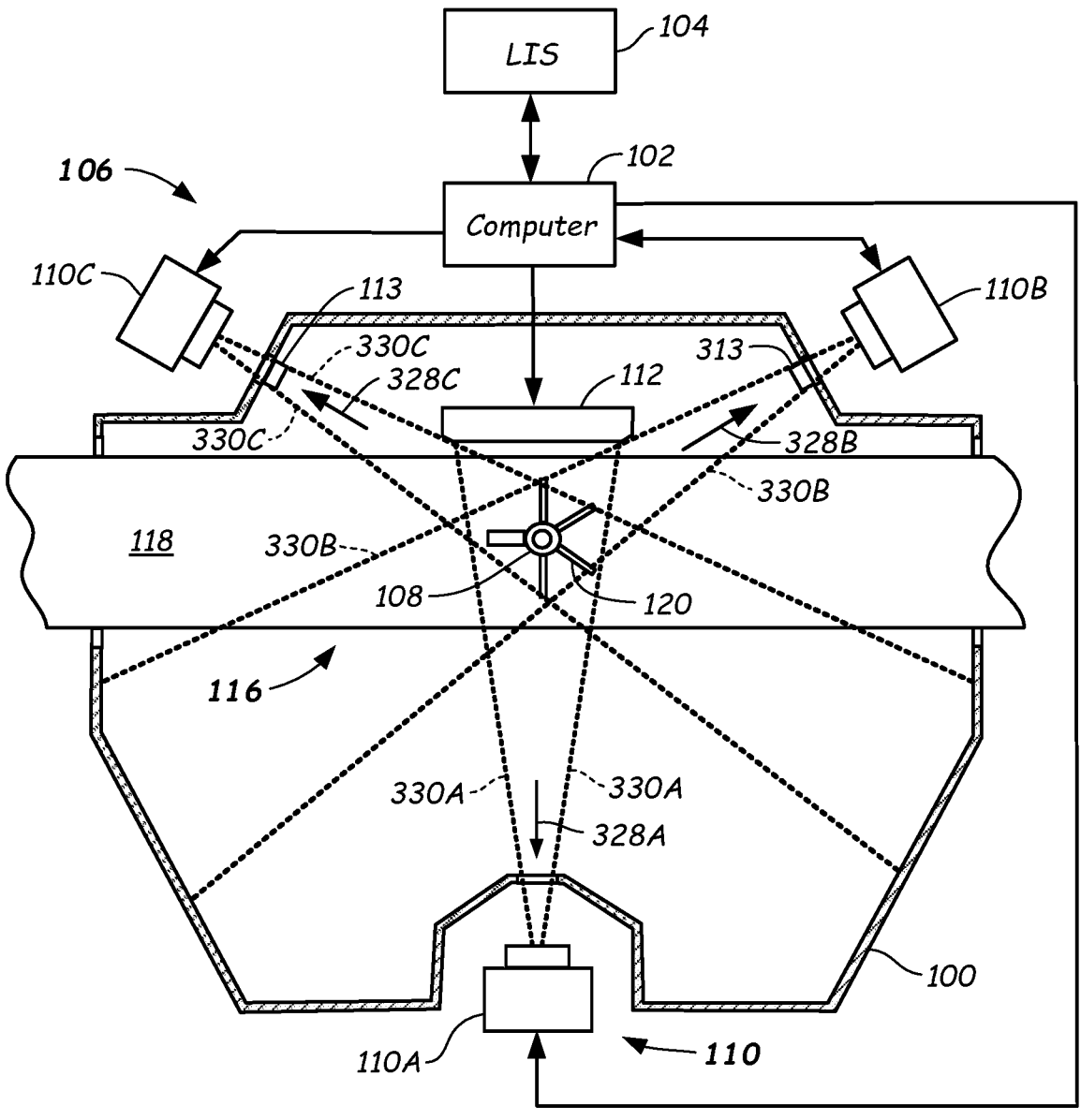
FIG. 3 illustrates a top partially sectioned view of an optical inspection station including a machine vision system (with top removed for illustration purposes) according to one or more embodiments.

Additional reference is made to FIG. 3, which illustrates a partially sectioned view of the optical inspection station 100. In the embodiments of FIGS. 1 and 3, the machine vision system 106 may include three imaging devices 110, the first imaging device 110A, the second imaging device 110B, and the third imaging device 110C. Accordingly, there are three imaging light paths, one imaging light path associated with each of the imaging devices 110. The first imaging device 110A has a first imaging light path 328A and a first field of view 330A associated therewith. The second imaging device 110B has a second imaging light path 328B and a second field of view 330B associated therewith. The third imaging device 110C has a third imaging light path 328C and a third field of view 330C associated therewith.

Illumination of the specimen container 108 within the fields of view 330A-330C may be provided by various illumination sources. In the embodiment of FIG. 3, the light panel 112 may provide back illumination for the first field of view 330A. An illumination source 313 may provide front illumination of the specimen container 108 while the specimen container 108 is in the second field of view 330B. The illumination source 113 may provide front illumination of the specimen container 108 while the specimen container 108 is in the third field of view 330C. The imaging devices 110 may capture images of the specimen container 108 when the specimen container 108 is anywhere within the fields of view 330A-330C of the respective imaging devices 110.

Figures 4A, 4B, 4C:
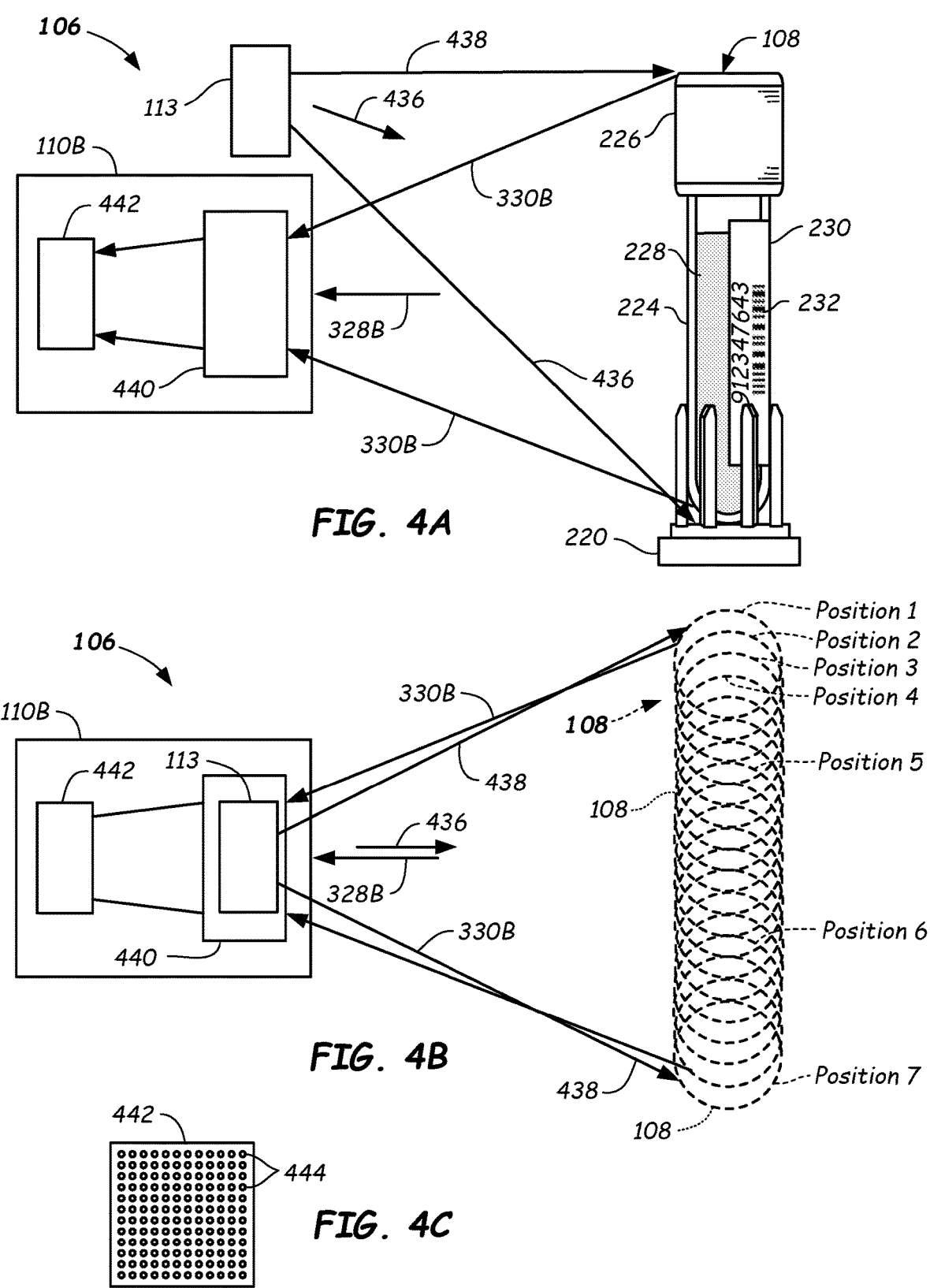
FIG. 4A illustrates a side elevation view of an imaging device of an optical inspection station imaging a specimen container according to one or more embodiments.
FIG. 4B illustrates a top plan view of the imaging device of FIG. 4A with the specimen container located in different longitudinal positions within a field of view of an imaging device according to one or more embodiments.
FIG. 4C illustrates a schematic diagram of a front view of an imager of an imaging device showing a plurality of pixels located on the imager according to one or more embodiments.

Reference is now made to FIG. 4A, which illustrates a side elevation view of the second imaging device 110B capturing an image of the specimen container 108. Reference is also made to FIG. 4B, which illustrates a top plan view of the second imaging device 110B with the specimen container 108 in different positions within the second field of view 330B. As shown, the illumination source 113 illuminates the specimen container 108 via a light path 436 having an illumination pattern 438. The illumination pattern 438 may illuminate the specimen carrier 108 as the specimen carrier 108 moves through different positions within the second field of view 330B. As shown in the side view of FIG. 4A, the illumination pattern 438 may provide illumination to the whole specimen container 108. As shown in the top view of FIG. 4B, the illumination pattern 438 may illuminate the specimen container 108 as the specimen container 108 moves through various positions in the second field of view 330B.

In the embodiment of FIG. 4B, the specimen container 108 is shown in a plurality of positions within the second field of view 330B of the second imaging device 110B as the specimen container moves through the second field of view 330B. Seven of the plurality of positions are illustrated as position 1 through position 7. When the specimen container 108 is in position 1 and position 7, the specimen container 108 may not be fully illuminated by the illumination source 313 and may not be fully within the second field of view 330B of the second imaging device 110B.

The light reflected from the specimen container 108 is received in the second imaging device 110B and is converted to image data. In some embodiments, the reflected light may pass through a lens 440 that focuses the reflected light onto an imager 442. Additional reference is made to FIG. 4C, which is a schematic diagram of a front view of an embodiment of the imager 442. The imager may be a charge-coupled device (CCD) or a complementary metal oxide semiconductor (CMOS), for example. The imager 442 includes an array, such as a two-dimensional array, of picture elements or pixels 444. The pixels 444 convert individual portions of an image to electrical signals, which are referred to herein as pixel values and are dependent on the intensity of light received on the pixels 444. Thus, pixels 444 in locations on the imager 442 that receive high intensities of light may generate high pixel values and pixels 444 in locations on the imager 442 that receive low intensities of light may generate low pixel values. In some embodiments, the pixel values are digitized, such as to pixel values between 0 and 255, wherein a pixel value of 0 may be indicative of no light received at the pixel and a pixel value of 255 may be indicative of a pixel being saturated.

During operation of the optical inspection station 100 (FIGS. 1 and 3), the transport system 116 may move the specimen container 108 into the optical inspection station 100. The transport system 116 moves the specimen container 108 to an imaging location within the optical inspection station 100, which is a location within the optical inspection station 100 that is in at least one field of view of a respective imaging device. One or more of the imaging devices 110 may capture sequential images of the specimen container 108 as the specimen container 108 moves through the respective field(s) of view as described herein. In some embodiments, the imaging devices 110 may capture images as the specimen container moves in 1 mm to 3 mm increments. These increments may be selected to provide adequate imaging to detect defects in the optical chain as described herein.

When the specimen container 108 is in the imaging location, one or more illumination sources may illuminate the specimen container 108. In the embodiments of FIGS. 1 and 3, the light panel 112 may provide back illumination of the specimen container 108 relative to the first imaging device 110A. As described above, an image of the back-illuminated specimen container 108 may then be captured by the first imaging device 110A. The illumination source 313 may front illuminate the specimen container 108 relative to the second imaging device 110B. The second imaging device 110B may then capture an image of the specimen container 108. The illumination source 113 may front illuminate the specimen container 108 relative to the third imaging device 110C. The third imaging device 110C may then capture an image of the specimen container 108.

Figure 5A:
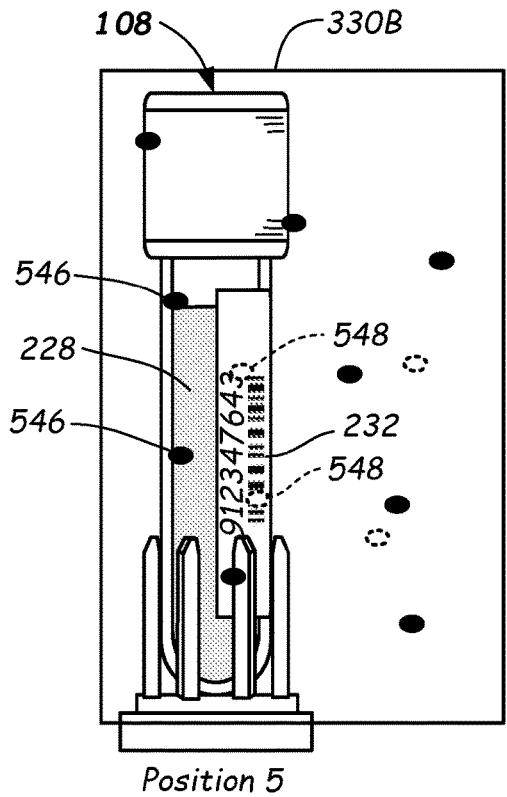
FIG. 5A illustrates an image of a specimen container captured by an imaging device of an optical inspection station, wherein the specimen container is located in a position within a field of view of the imaging device, and wherein defects are present in an optical chain of the optical inspection station according to one or more embodiments.
Figure 5B:
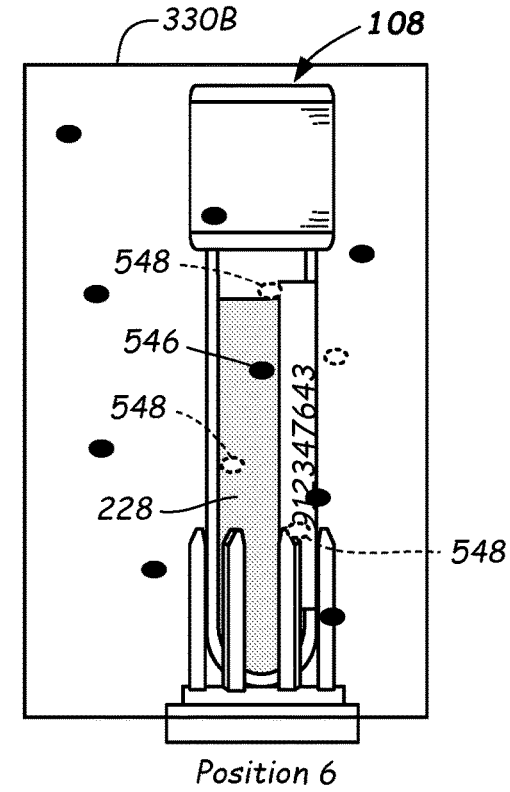
FIG. 5B illustrates an image of the specimen container of FIG. 5A located in another position within the field of view of the imaging device and wherein defects are present in the optical chain of the optical inspection station according to one or more embodiments.

Referring to FIG. 4B, the specimen container 108 may be located between positions 1-7 in the second field of view 330B of the second imaging device 110B. The second imaging device 110B captures an image or sequential images of the specimen container 108 as the specimen container moves through the second field of view 330B, such as between position 1 and position 7. Reference is made to FIGS. 5A-5B, which illustrate the specimen container 108 in different positions within a field of view. In the embodiment of FIGS. 5A-5B, the field of view is the second field of view 330B associated with the second imaging device 110B, but may be identical or similar to other fields of views associated with other imaging devices.

FIG. 5A illustrates the specimen container 108 in position 5 as shown in FIG. 4B. FIG. 5B illustrates the specimen container 108 in position 6 as shown in FIG. 4B. The field of view 330B may have different sizes that shown in FIGS. 5A and 5B that may generate image data of different portions of the specimen container 108. In the embodiments described herein there is no light panel or reflective device behind the specimen container 108 in the optical inspection station 100 (FIGS. 1 and 3). Accordingly, the background of the images other than the image of the specimen container 108 is dark.

The term "optical chain" as used herein refers to light paths and devices that process light. Optical chains may include illumination sources (e.g., illumination source 113 and illumination source 313), imaging devices 110. The optical chain may include components of the imaging devices 110, such as the lens 440 and the imager 442. The optical chain may include the light paths between the illumination sources and the specimen container 108 and between the specimen container 108 and the imaging devices 110. Defects (e.g., anomalies or faults) in the optical chain(s) will be described herein.

In the embodiments of FIGS. 5A and 5B, the optical chain has defects, which are shown as dark spots 546 and bright spots 548. The sizes of the dark spots 546 and the bright spots 548 shown in FIGS. 5A-5B may be enlarged for illustration purposes. The bright spots 548 are illustrated as being encircled with dashed lines for illustration purposes. In practice, the bright spots 548 are not encircled by dashed lines. Dark spots 546 may be pixel values that are a predetermined amount less than the average pixel values. For example, dark spots 546 may be identified as pixel values that are 10% less than the average of all pixel values. Bright spots 548 may be pixel values that are a predetermined amount greater than the average pixel values. For example, bright spots 548 may be identified as pixel values that are 10% greater than the average of all pixel values.

The dark spots 546 may be caused by several types of defects, including dead pixels and/or particles in the optical chain. Dead pixels are pixels in the imager 442 that generate low voltages or no voltages irrespective of the light intensity incident on the dead pixels. The resulting images captured with the imager 442 (FIG. 4C) having dead pixels in the imager 442 will include dark spots in the resulting images as shown in FIGS. 5A and 5B. The bright spots 548 may be caused by defective pixels (e.g., saturated pixels) that generate high voltages or maximum voltages irrespective of the intensity of light incident on the saturated pixels. In some situations, particles in the optical chain may refract excessive light onto some of the pixels and cause the pixels to saturate.

The dark spots 546 and the bright spots 548 interfere with analysis of the images representative of the specimen container 108 and/or the specimen 228 (FIG. 2) located therein. For example, the image data will include pixel values representative of the bright spots 548 that are too high and pixel values representative of the dark spots 546 that are too low. As shown in FIG. 5A, the dark spots 546 may be interpreted as spots in the specimen 228. The bright spots 548 in FIG. 5A may interfere with images of the barcode 232. As shown in FIG. 5B, both the dark spots 546 and the bright spots 548 may interfere with images of the specimen 228.

Figure 6A:
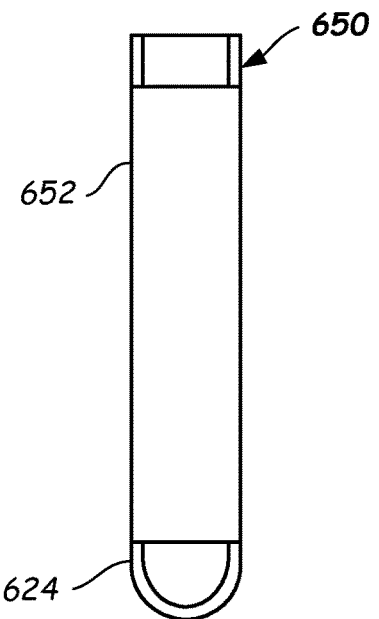
FIG. 6A illustrates a side elevation view of a reflective tool used to check an optical chain of a machine vision system according to one or more embodiments.
Figure 6B:
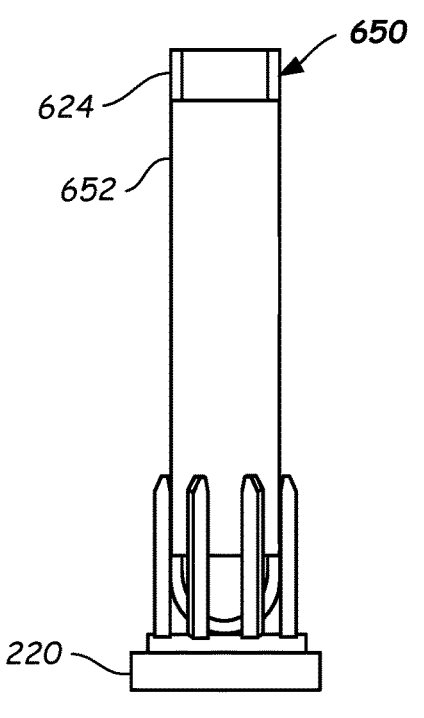
FIG. 6B illustrates a side elevation view of a reflective tool used to check an optical chain of a machine vision system, wherein the reflective tool is located in a carrier used to transport the reflective tool in an upright orientation within a vision-based inspection station according to one or more embodiments.

The apparatus and methods described herein capture images a reflective tool described herein to check the status of the optical chain(s) and find defects in the optical chain. Reference is now made to FIG. 6A, which illustrates an embodiment of a reflective tool 650. The reflective tool 650 may be configured as a tube 624, such as the tube 224 (FIG. 2) of the specimen container 108, with a reflective exterior 652. The reflective exterior 652 may be a color that reflects light emitted by the illumination source 113 (FIG. 3) and/or the illumination source 313 (FIG. 3). In some embodiments, the reflective exterior 652 may be a white label or sleeve affixed to the tube 624. The reflective tool 650 is illustrated as being round when viewed in cross-section. In other embodiments, the reflective tool 650 may have other shapes, such as oval or shaped as a polygon when viewed in cross-section. FIG. 6B illustrates the reflective tool 650 received in the carrier 220, which enables the reflective tool 650 to be transported through the optical inspection station 100 (FIG. 3), such as by the transport system 116 (FIG. 3).

The reflective tool 650 may have a uniform reflectance. For example, the reflectance of the reflective tool 650 may not vary by more than 5%. In other embodiments, the reflectance of the reflective tool 650 may not vary by more than 10%. Thus, the reflective tool 650 reflects light uniformly in response to the illumination sources 113, 313 (FIG. 3) illuminating the reflective tool 650. In embodiments, where the reflective tool 650 has a label or other reflective surface attached thereto, the label or other reflective surface may have uniform reflectance.

The status of the optical chain may be checked by imaging and analyzing one or more images (e.g., sequential images) of the reflective tool 650 in different positions within the fields of view. The sequential images may be used to generate a synthetic curtain or synthetic background that, under ideal conditions, should have a uniform intensity, such as without the dark spots 546 and the bright spots 548. In some embodiments individual images are of the reflective tool 650 are analyzed. In some embodiments, a uniform synthetic background may have a light intensity wherein 90% of the pixel values are within 10% of each other. In other embodiments, a uniform synthetic background may have a light intensity wherein 95% of the pixel values are within 5% of each other.

Figures 7A, 7B:
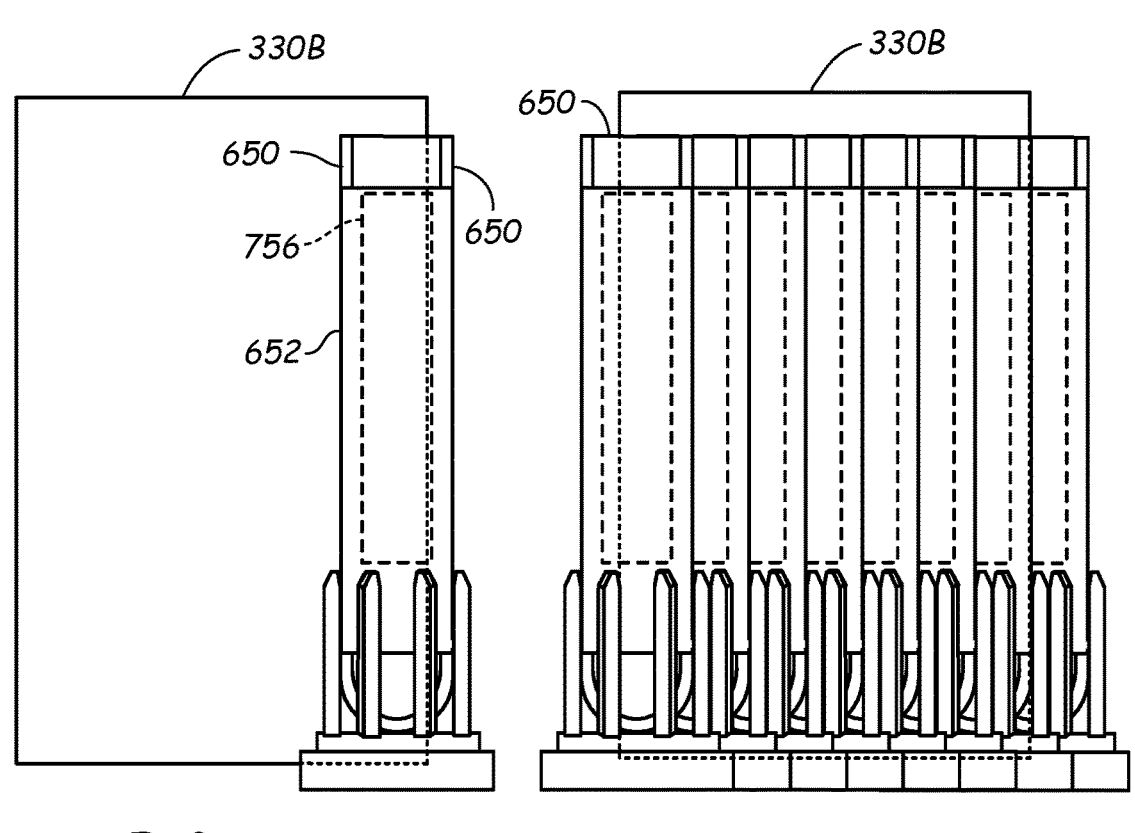
FIG. 7A illustrates a side elevation view of a reflective tool in a first position of a field of view of an imaging device according to one or more embodiments.
FIG. 7B illustrates multiple images of a reflective tool in a plurality of different positions within a field of view of an imaging device according to one or more embodiments.

In some embodiments, the sequence of images are electronically stitched together to form the synthetic background. Defects in the optical chain will cause artifacts, such as the dark spots 546 and/or the bright spots 548 to appear in one or more of the sequence of images. Reference is made to FIG. 7A, which illustrates the reflective tool 650 while the reflective tool 650 is located within the second field of view 330B. For example, the reflective tool 650 shown in FIG. 7A may be in position 1 or position 7 as shown in FIG. 4B. It is noted that only portions of the reflective tool 650 located within the second field of view 330B (FIG. 4B) are captured by the second imaging device 110B when the reflective tool 650 is in the position shown in FIG. 7A. The processes described herein may apply to other fields of view.

In the embodiment of FIG. 7A, the reflective tool 650 is proximate position 1 (FIG. 4B), wherein only a portion of the reflective tool 650 is in the second field of view 330B, so only a portion of the reflective tool 650 is captured by the second imaging device 110B. In some embodiments, only a portion of images of the reflective exterior 652 are processed to generate the synthetic background. In the embodiment of FIG. 7A, a front portion 756 of the reflective exterior 652 may be analyzed to generate to the synthetic background. The front portion 756 is the portion of the reflective exterior 652 that is facing the second imaging device 110B. The size of the front portion 756 may be a function of the reflectivity of the reflective exterior 652, the illumination incident on the reflective exterior 652, and/or the desired uniformity of the synthetic background. For example, when the front portion 756 is small, more portions of the reflective exterior 652 that are normal to the second imaging light path 328B may be processed, which yields a high uniformity in the synthetic background.

Reference is now made to FIG. 7B, which illustrates the reflective tool 650 as the reflective tool 650 is transported through the second field of view 330B. As shown in FIG. 7B, images the front portions 756 of the reflective tool 650 overlap in the sequential images. In some embodiments, sequential images may of the reflective tool 650 may overlap one another by at least 75%. In other embodiments, sequential images may of the front portions 756 may overlap one another by at least 85%. The images of the front portions 756 may be processed to form a synthetic background as described herein that is substantially uniform.

Figures 8A, 8B:
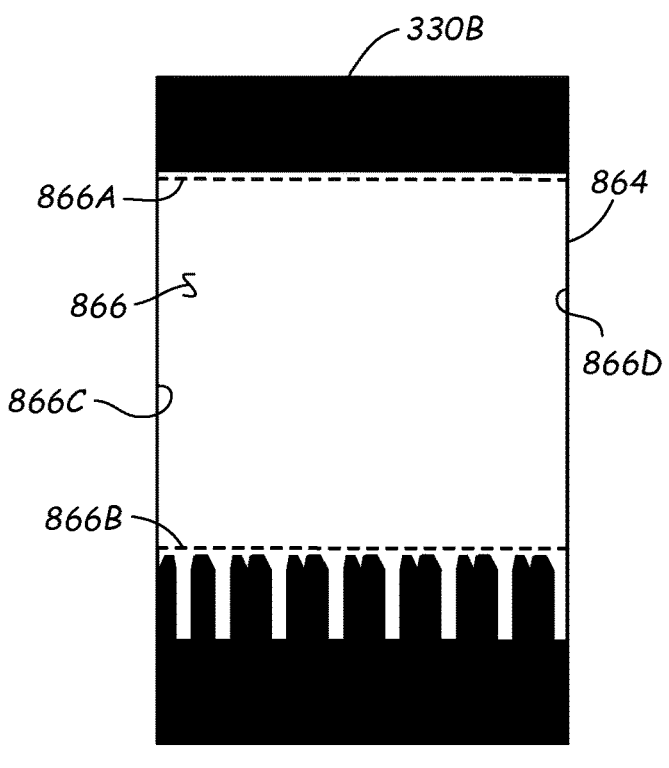
FIG. 8A illustrates an image of a reflective tool captured at one position by a machine vision system of an optical inspection station according to one or more embodiments.
FIG. 8B illustrates an image of a synthetic background generated by electronically stitching together a sequence of images of a reflective tool according to one or more embodiments.

Additional reference is made to FIG. 8A, which illustrates an image 860 of the reflective tool 650 captured by the second imaging device 110B (FIG. 3). As shown in FIG. 8A, only the reflective exterior 652 is visible in the image 860. The interior of the optical inspection station 100 (FIG. 3) is dark, so only the reflective exterior 652 reflects light generated by the illumination source 113 (FIG. 3). As described with reference to FIG. 7B, sequential images of the reflective tool 650 are captured by the second imaging device 110B and/or other imaging devices in the machine vision system 106 as the reflective tool 650 is moved through the second field of view 330B. For example, the reflective tool 650 may be stopped at different locations in the second field of view 330B while individual images of reflective tool 650 are captured. In some embodiments, the reflective tool 650 is moved 1 mm to 3 mm for each sequential image. Such incremental movements of the reflective tool may provide a uniform synthetic background.

As described herein, sequential images of the front portion 756 of the reflective exterior 652 may be processed and analyzed. With additional reference to FIG. 8B, the processing may overlap sequential images of the front portion 756 to generate an image of a synthetic background 864. Under ideal conditions, the intensity of pixels values of the image of the synthetic background 864 are the same, which is indicative of a uniform synthetic background 864. In some embodiments, a majority or a predetermined number of pixel values may be within a predetermined range as described above, which constitutes a uniform synthetic background 864.

In the embodiment of FIG. 8B, the synthetic background 864 may be formed by stitching software that electronically stitches sequential images of the front portion 756 together to form the synthetic background 864. The stitching software may be identical or similar to image processing software used to generate panoramic images from sequentially-captured individual images. Other software or processes may be used to generate the synthetic background 864 from the images of the front portion 756. In the embodiment of FIG. 8B, a region of interest 866 is a portion of the synthetic background 864 that will be analyzed. The region of interest 866 is bounded by a top edge 866A and a bottom edge 866B, which may be top and bottom edges, respectively, of the front portion 756. The region of interest 866 may include a left edge 866C and a right edge 866D, which may be left and right edges, respectively, of the second field of view 330B.

Figure 9:
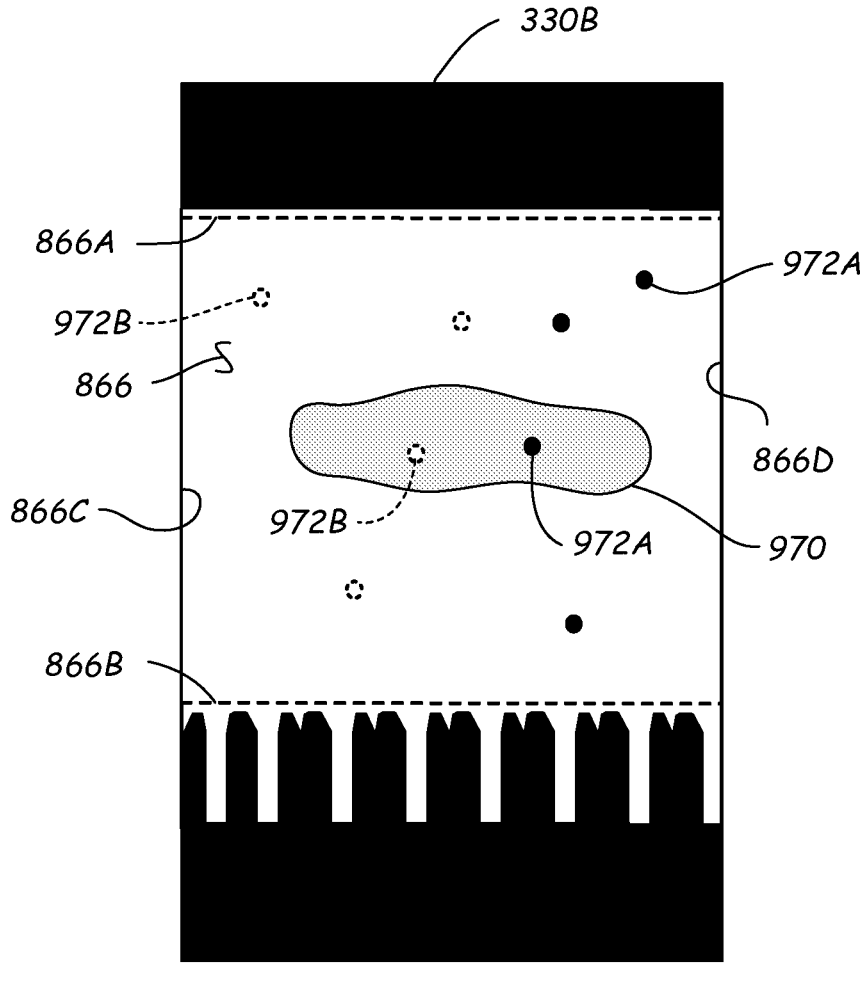
FIG. 9 illustrates a synthetic background generated from a sequence of images of a reflective tool, wherein the synthetic background shows defects in the optical chain according to one or more embodiments.

Reference is now made to FIG. 9, which illustrates an image of the synthetic background 864 showing artifacts or images indicative of defects in the optical chain. When there are no defects in the optical chain, the pixel values should all be within a predetermined value. In some embodiments, the pixel values in an ideal region of interest 866 may be close to saturated pixel values, such as values of 250 out of a maximum value of 255, for example. In other embodiments, the pixel values in the ideal region of interest 866 may be less than close to saturated. In the embodiment of FIG. 9, the image of the synthetic background 864 includes a spot 970, wherein the pixel values constituting the spot 970 are different (e.g., less than) pixel values of an ideal region of interest. The spot 970 may be indicative of particles (e.g., dirt) on the lens 440 and/or the imager 442 (FIG. 4C). The spot 970 may also be indicative of a faulty illumination source 313 (FIG. 3) and/or particles on the illumination source 313. The particles may cause less light to be incident the imager 442, which causes the pixel values of the corresponding pixels to be less than pixel values of the ideal region of interest 866. The spot 970 may be identified by a predetermined number of pixel values of adjacent pixels having values below a predetermined value.

The region of interest 866 may also include one or more dark spots 972A and/or one or more bright spots 972B. The dark spots 972A may be indicative of dead pixels in the imager 442, which do not produce any voltage irrespective of the intensity of light incident on the dark pixels. The dark spots 972A may also be indicative of particles in the optical chain, such as on the lens 440 (FIG. 4B) and/or the illumination source 313 (FIG. 3). The bright spots 972B may be indicative of saturated pixels that produce high voltages irrespective of the intensity of light incident on the saturated pixels. The bright spots 972B may also be indicative of particles, such as clear particles, in the optical chain that cause specular reflection or that focus light onto certain pixels.

Upon detecting bright spots and/or dark spots in the region of interest 866, a technician or the like may clean items in the optical chain. For example, the technician or the like may clean the lens 440 (FIG. 4B). If one or more of the spots, bright spots, and/or dark spots remains in the region of interest 866 after the items in the optical chain are cleaned, the technician may determine that one or more pixels in the imager 442 are defective. In future image analysis, pixel values generated by the defective pixels may be ignored. If a predetermined number of pixels are defective, the technician may replace the imager 442 or the respective imaging device.

In some embodiments, the computer 102 (FIG. 3) may receive image data from the imaging devices 110 (FIG. 3). The computer 102 may execute software that generates the synthetic background 864 based on the image data. The computer 102 may also execute the software that analyzes the region of interest 866. For example, the software may analyze the image data to determine if the region of interest contains a bright spot and/or a dark spot. The software may instruct the technician to clean the optical path in response to the analysis. If bright spot and/or a dark spot remain after the optical path is cleaned, the software may designate the pixels associated with the bright spot and/or the dark spot as defective. The software may further ignore pixel values generated by defective pixels when analyzing images, such as images of the specimen container 108 (FIG. 2). In some embodiments, the software may generate notices of the defects.

In some embodiments, sequential images of the reflective exterior 652 may be analyzed instead of generating a synthetic background. For example, the above-described analysis may be performed with the reflective tool 650 (FIG. 4B) in different positions within a field of view of an imaging device. Referring to FIG. 4B, an image of the reflective tool 650 may be captured when the reflective tool 650 is in position 1. The image of the reflective exterior 652 may then be analyzed to determine whether any defects exist in the optical chain. The analysis may determine whether particles are present in the optical chain or whether any pixels 444 corresponding to position 1 are defective. The reflective tool 650 may then be moved to position 2 where an image of the reflective exterior 652 is imaged and analyzed. The analysis may determine whether particles are present in the optical chain or whether any pixels 444 corresponding to position 2 are defective. This process may be repeated as the reflective tool 650 is positioned at different positions in the field of view.

Reference is now made to FIG. 10, which illustrates a flowchart showing a method 1000 of identifying a defect in a machine vision system (e.g., optical inspection station 100). The method 1000 includes, in 1002, providing a first imaging device (e.g., imaging device 110B) having a first field of view (e.g., field of view 330B). The method 1000 includes, in 1004, moving a reflective tool (e.g., reflective tool 650) through the first field of view. The method 1000 includes, in 1006, capturing a plurality of images of the reflective tool at different locations in the first field of view using the first imaging device. The method 1000 includes, in 1008, analyzing at least one of the plurality of images to identify one or more defects in the machine vision system.

Figure 11:
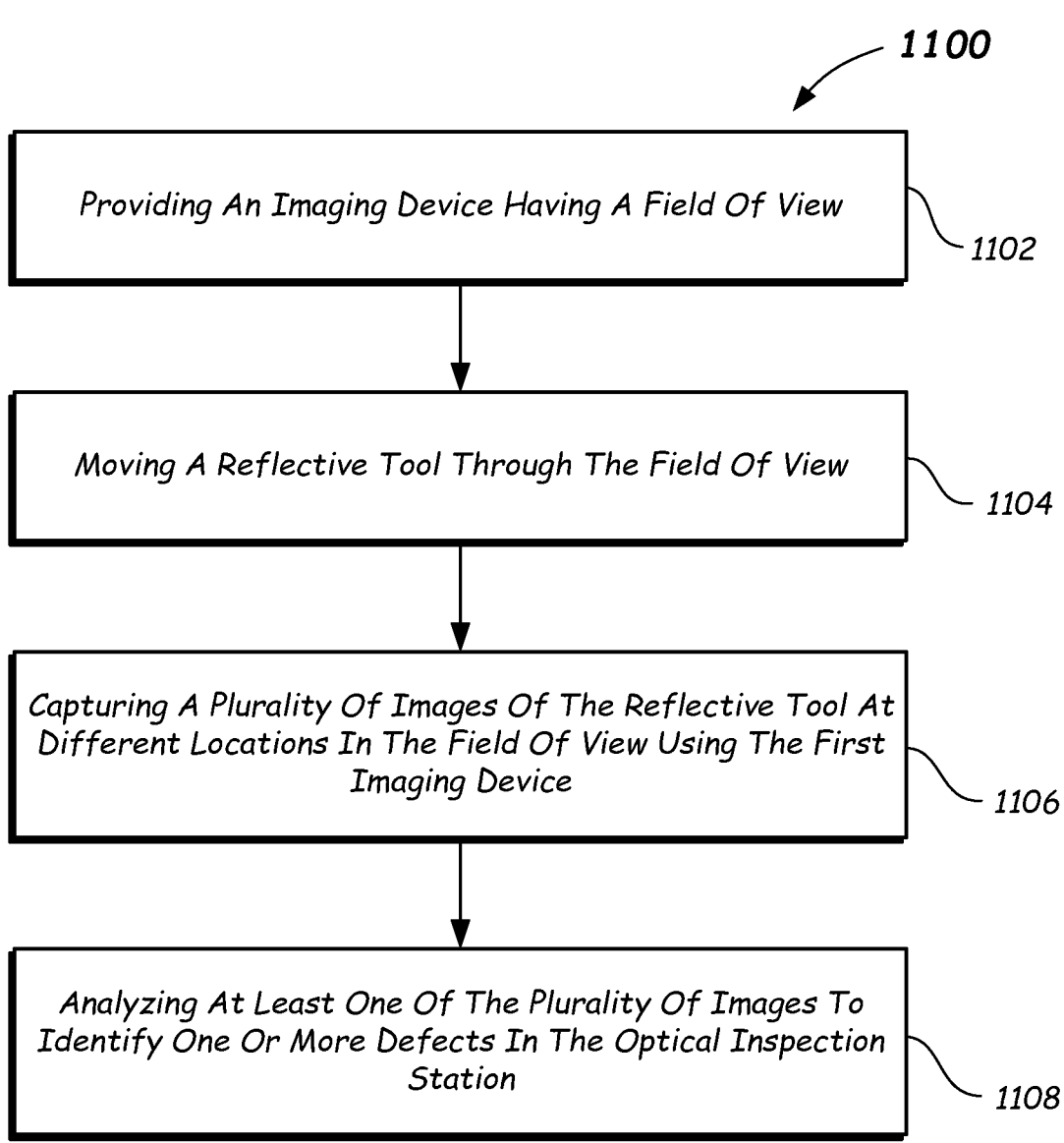
FIG. 11 illustrates a flowchart showing a method of identifying a defect in an optical inspection station according to one or more embodiments.

Reference is made to FIG. 11, which illustrates a flowchart showing a method 1100 of identifying a defect in an optical inspection station (e.g., machine vision system 106). The method 1100 includes, in 1102, providing an imaging device (e.g., imaging device 110B) having a field of view (e.g., field of view 330B). The method includes, in 1104, moving a reflective tool (e.g., reflective tool 650) through the field of view. The method 1100 includes, in 1106, capturing a plurality of images of the reflective tool at different locations in the field of view using the imaging device. The method 1100 includes, in 1108, analyzing at least one of the plurality of images to identify one or more defects in the optical inspection station.

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure but, to the contrary, to cover all modifications, equivalents, and alternatives falling within the scope of the claims.

What is claimed is:

1. A method of identifying a defect in a machine vision system, comprising:

providing a first imaging device having a first field of view;

moving a reflective tool through the first field of view;

capturing a plurality of images of the reflective tool at different locations in the first field of view using the first imaging device;

stitching two or more of the plurality of images of the reflective tool together to generate a synthetic background; and analyzing at least one of the plurality of images including the synthetic background to identify whether there are one or more defects in the machine vision system, wherein the plurality of images comprises pixel values, and the stitching further comprises stitching two or more of the plurality of images together to generate a synthetic background having a light intensity wherein 90% of the pixel values are within 10% of each other.

2. The method of claim 1, further comprising illuminating the reflective tool during the capturing.

3. The method of claim 1, wherein moving the reflective tool, comprises moving a tube having a reflective surface through the first field of view.

4. The method of claim 1, wherein moving the reflective tool comprises moving a tube through the first field of view, the tube having a label attached thereto, the label having uniform reflectance.

5. The method of claim 1, wherein:

the moving the reflective tool further comprises moving a tube through the first field of view, the tube having a region of interest that is reflective; and the capturing a plurality of images of the reflective tool further comprises capturing a plurality of images of the region of interest.

6. The method of claim 5, wherein the region of interest is white.

7. The method of claim 1, wherein the analyzing further comprises analyzing a region of interest.

8. The method of claim 1, wherein the analyzing further comprises analyzing one or more of the plurality of images to determine whether a particle is present on a lens of the first imaging device.

9. The method of claim 1, wherein the analyzing further comprises analyzing one or more of the plurality of images to determine whether one or more pixels of the first imaging device are defective.

10. The method of claim 1, wherein the capturing further comprises capturing 10 or more images of the reflective tool at 10 or more different locations in the first field of view.

11. The method of claim 1, wherein the capturing a plurality of images further comprises capturing a plurality of overlapping images of the reflective tool.

12. The method of claim 11, wherein the plurality of images overlap each other by at least 75%.

13. The method of claim 1, further comprising:

providing a second imaging device having a second field of view;

moving the reflective tool through the second field of view;

capturing a plurality of second images of the reflective tool at different locations in the second field of view; and analyzing at least one of the plurality of second images to identify one or more defects in the machine vision system.

14. A method of identifying a defect in an optical inspection station, comprising:

providing an imaging device having a field of view;

providing a transport system configured to move specimen containers through the field of view;

moving a reflective tool through the field of view;

capturing a plurality of images of the reflective tool at different locations in the field of view using the imaging device;

stitching two or more of the plurality of images of the reflective tool together to generate a synthetic background; and analyzing at least one of the plurality of images including the synthetic background to identify whether there are one or more defects in the optical inspection station, wherein the plurality of images comprises pixel values, and the stitching further comprises stitching two or more of the plurality of images of the reflective tool together to generate a synthetic background having a light intensity wherein 90% of the pixel values are within 10% of each other.

15. The method of claim 14, wherein the reflective tool has a shape of a tube.

16. The method of claim 14, wherein the capturing a plurality of images further comprises capturing a plurality of images of the reflective tool that overlap each other.

17. A machine vision system, comprising:

an imaging device having a field of view and configured to capture a plurality of images of a reflective tool at different locations in the field of view;

a transport system configured to move specimen containers and the reflective tool through the field of view; and a computer configured to stitch two or more of the plurality of images of the reflective tool together to generate a synthetic background and analyze at least one of the plurality of images including the synthetic background to determine whether a defect exists in an optical chain of the machine vision system, wherein the plurality of images comprises pixel values, and the stitching further comprises stitching two or more of the plurality of images together to generate a synthetic background having a light intensity wherein 90% of the pixel values are within 10% of each other.

* * * * *